US011743160B2

(12) United States Patent
Szigeti et al.

(10) Patent No.: US 11,743,160 B2
(45) Date of Patent: *Aug. 29, 2023

(54) AUTOMATING AND EXTENDING PATH TRACING THROUGH WIRELESS LINKS

(71) Applicant: Cisco Technology, Inc., San Jose, CA (US)

(72) Inventors: Thomas Szigeti, Vancouver (CA); Jerome Henry, Pittsboro, NC (US); Robert E. Barton, Richmond (CA); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,887

(22) Filed: Aug. 2, 2022

(65) Prior Publication Data

US 2022/0377002 A1    Nov. 24, 2022

Related U.S. Application Data

(63) Continuation of application No. 17/031,312, filed on Sep. 24, 2020, now Pat. No. 11,444,860.

(51) Int. Cl.
*H04L 43/0864* (2022.01)
*H04L 43/0894* (2022.01)
*H04L 43/10* (2022.01)
*H04W 24/04* (2009.01)
*H04W 24/10* (2009.01)
*H04W 84/12* (2009.01)

(52) U.S. Cl.
CPC ...... *H04L 43/0864* (2013.01); *H04L 43/0894* (2013.01); *H04L 43/10* (2013.01); *H04W 24/04* (2013.01); *H04W 24/10* (2013.01); *H04W 84/12* (2013.01)

(58) Field of Classification Search
CPC ............. H04L 43/0817; H04L 43/0858; H04L 43/0864; H04L 43/0894; H04L 43/10; H04L 43/103; H04L 43/12; H04W 24/04; H04W 24/08; H04W 24/10; H04W 84/12
See application file for complete search history.

(56) References Cited

U.S. PATENT DOCUMENTS

| 11,025,501 B1* | 6/2021 | Iyer .................. H04L 41/147 |
| 2005/0169209 A1* | 8/2005 | Miu .................. H04W 28/0808 370/328 |
| 2007/0124412 A1* | 5/2007 | Narayanaswami ..... H04L 41/12 709/217 |

(Continued)

*Primary Examiner* — Kostas J Katsikis
(74) *Attorney, Agent, or Firm* — Patterson + Sheridan, LLP

(57) ABSTRACT

Automating and extending path tracing through wireless links is provided by receiving request to perform a network trace over a wireless link provided by an Access Point (AP) configured as a transparent forwarder between a trace source and a trace target; monitoring a trace packet from a first time of arrival at the AP, a first time of departure from the AP, a second time of arrival at the AP, and a second time of departure from the AP; monitoring a buffer status of the AP at the first time of arrival and the second time of arrival; and in response to identifying a network anomaly based on the trace packet and the buffer status, adjusting a network setting at the AP.

20 Claims, 6 Drawing Sheets

(56) References Cited

U.S. PATENT DOCUMENTS

| | | | |
|---|---|---|---|
| 2010/0165872 A1* | 7/2010 | Jiang | H04L 49/90 370/253 |
| 2011/0058498 A1* | 3/2011 | Miyoshi | H04L 45/123 370/253 |
| 2016/0037380 A1* | 2/2016 | Ozturk | H04L 5/001 370/331 |
| 2019/0334794 A1* | 10/2019 | Halepovic | H04L 43/20 |
| 2022/0217078 A1* | 7/2022 | Ford | H04L 45/70 |

* cited by examiner

AUTOMATING AND EXTENDING PATH TRACING THROUGH WIRELESS LINKS

CROSS-REFERENCE TO RELATED APPLICATIONS

This application is a continuation of co-pending U.S. patent application Ser. No. 17/031,312 filed Sep. 24, 2020. The aforementioned related patent application is herein incorporated by reference in its entirety.

TECHNICAL FIELD

Embodiments presented in this disclosure generally relate to wireless networking. More specifically, embodiments disclosed herein provide for improving networking conditions between wireless linked devices (e.g., over Wi-Fi connections).

BACKGROUND

In a network, as various service level attributes deteriorate, performance and throughput of various application flows over the network path also decreases. Network operators that seek to improve the performance and throughput of the application flows over the network, therefore need to know where to focus efforts, and what actions to take to resolve issues associated with packet/frame loss, jitter, delay, etc. in the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
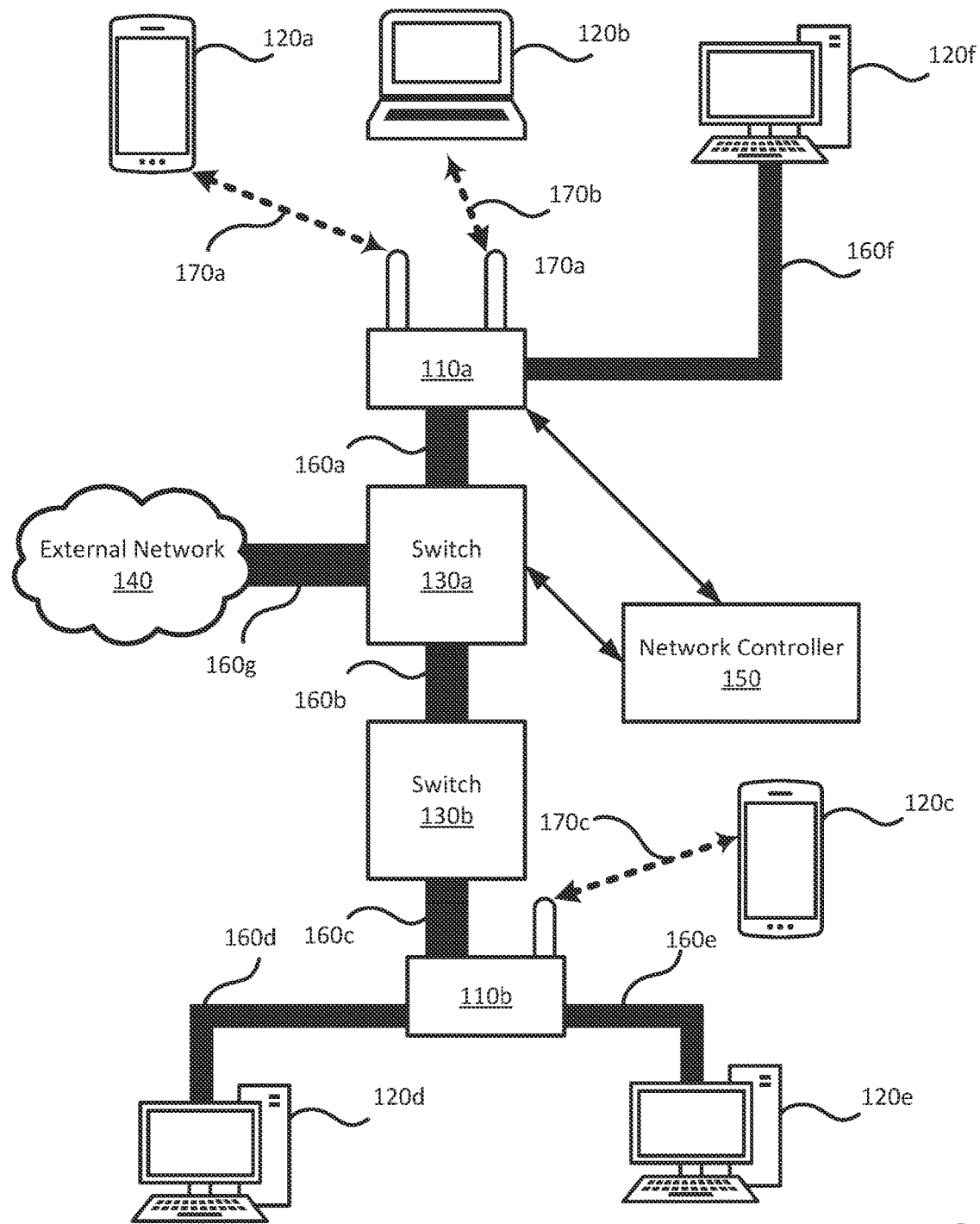
FIG. 1 illustrates an example network that includes wired links and wireless links between various devices, according to embodiments of the present disclosure.

One embodiment presented in this disclosure is a method, comprising: receiving request to perform a network trace over a wireless link provided by an Access Point (AP) configured as a transparent forwarder between a trace source and a trace target; monitoring a trace packet from a first time of arrival at the AP, a first time of departure from the AP, a second time of arrival at the AP, and a second time of departure from the AP; monitoring a buffer status of the AP at the first time of arrival and the second time of arrival; and in response to identifying a network anomaly based on the trace packet and the buffer status, adjusting a network setting at the AP.

One embodiment presented in this disclosure is a system, comprising: a processor; and a memory device including instructions that when executed by the processor perform an operation including: receiving request to perform a network trace over a wireless link provided by an Access Point (AP) configured as a transparent forwarder between a trace source and a trace target; monitoring a trace packet from a first time of arrival at the AP, a first time of departure from the AP, a second time of arrival at the AP, and a second time of departure from the AP; monitoring a buffer status of the AP at the first time of arrival and the second time of arrival; and in response to identifying a network anomaly based on the trace packet and the buffer status, adjusting a network setting at the AP.

One embodiment presented in this disclosure is a memory device including computer readable instructions that when executed by a processor perform an operation comprising: receiving request to perform a network trace over a wireless link provided by an Access Point (AP) configured as a transparent forwarder between a trace source and a trace target; monitoring a trace packet from a first time of arrival at the AP, a first time of departure from the AP, a second time of arrival at the AP, and a second time of departure from the AP; monitoring a buffer status of the AP at the first time of arrival and the second time of arrival; and in response to identifying a network anomaly based on the trace packet and the buffer status, adjusting a network setting at the AP.

Example Embodiments

The present disclosure provides for improved tools to perform path tracing through wireless elements of a network to thereby identify and remedy network issues in wired or wireless portions of a network path. Path tracing functions can provide end-to-end analysis of an application-flow's performance as associated traffic traverses the network. These path tracing functions can identify underperforming network devices, congested links, policy-restrictions, and various other performance impeding issues and where those issues occur. In a wireless network, several portions of the path can traverse wired links between devices or wireless links between devices. Wireless portions of the network path have proven particularly challenging to measure for path tracing purposes as the wireless transmission medium is unpredictable due to the wireless devices being mobile, the transmission medium being shared by multiple devices, the presence of active or passive interference sources (e.g., rogue devices, walls), etc.

To capture the performance characteristics of a wireless link so that a network operator can accurately and effectively address any issues affecting network performance over the wireless link, the present disclosure instructs the network to treat the Access Point (AP) for a wireless client as transparent forwarder, rather than a node in the network. Various timing characteristics for test packets traversing the AP-to-client and client-to-AP links, which are communicated back to a network controller to determine the networking conditions over the wireless portions of the network path. The network controller can then use the determined networking conditions to adjust network settings to maintain a predefined service level for the network, alert a network operator to a network outage or other anomalous condition, log network activity, etc.

FIG. 1 illustrates an example network 100 that includes wired links 160a-g (generally, wired links 160) and wireless links 170a-c (generally, wireless links 170) between various devices, according to embodiments of the present disclosure. The network 100 includes a first AP 110a (generally, AP 110), a first switch 130a (generally, switch 130), a second switch 130b, and a second AP 110b, which are managed by a network controller 150 to provide connectivity services to a plurality of clients 120a-f (generally, client 120) among each other (e.g., as local network traffic) or to and from an external network 140 (e.g., the Internet). As will be appreciated, more or fewer devices can be used in a network 100 than are shown in FIG. 1, and the arrangements and architectures of those devices can also be different than the example shown in FIG. 1.

In various embodiments, the network controller 150 is a software service that is provided locally to the network 100 on an AP, on a client 120 (e.g., a local network server client 120), or directly on a switch 130. In other embodiments, the network controller 150 is a software service that is provided remotely or "in the cloud" as a service offered through the external network 140 to manage the local network 100. The network controller 150 monitors the time that trace packets take to traverse the links (wired or wireless) between a trace source and a trace target, which can be an AP 110, a client 120, or a switch 130 in various embodiments.

The switches 130 provide for packet routing within the network 100 and can include edge switches (such as the first switch 130a) that are connected to an external network 140, and internal switches (such as the second switch 130b) that are not connected to an external network 140. Switches 130 may route data to one another, an external network 140, or to/from the APs 110, which handle direct communications with the clients 120. As shown, the first switch 130a is connected to the first AP 110a via a first wired link 160a, to the second switch 130b via a second wired link 160b, and to the external network 140 via a seventh wired link 160g. Similarly, the second switch 130b is connected to the second AP 110b via a third wired link 160c (and to the first switch 130a via the second wired link 160b). In various embodiments the wired links 160 are provided by various wires and carry data via electrical signals, but may also include optical fibers that carry data via optical signals.

The APs 110 provide connectivity between the switches 130 and the clients 120 or between the clients 120 via one or more of wired links 160 and wireless links 170. Although illustrated as providing both wired links 160 and wireless links 170, in various embodiments, a given AP 110 can provide only wired links 160, only wireless links 170, or a mixture of both. The wired links 160 can include various wired transmission media (e.g., Category-5 cabling) that are used to transmit data to or receive data from a specific client 120 that is connected to the AP 110 via the wired transmission medium.

The wireless links 170, however, use signals propagated through the air (and some intervening materials) to carry data between the AP 110 and the client 120. In various embodiments, the wireless links 170 are stochastic (e.g., conditions at time $t_x$ are not necessarily reflective of conditions at time $t_{x+1}$), duplexed (e.g., more than one client 120 can compete for an access the same link), and dynamic (e.g., clients 120 changing locations), connecting/disconnecting/reconnecting based on network or transmission medium conditions. The wireless links 170 can be established between an AP 110 and a client 120 using various wireless standards (e.g., the IEEE 802.11 "WiFi" family of standards) that allow for certain portions of the spectrum to be used with various multiplexing schemes so that two or more clients 120 can share the transmission medium.

As shown, the first AP 110a offers a first wireless link 170a to a first client 120a and a second wireless link 170b to a second client 120b, in addition to a sixth wired link 160f to a sixth client 120c. The second AP 110b is shown offering a fourth wired link 120d to a fourth client 160d, a fifth wired link 120e to a fifth client 120e, and a third wireless link 170c to a third client 120c. In various embodiments, the wireless clients 120a-c can be in signaling range of one another or more than one AP 110. In one example, the second client 120b is positioned in the environment such that the second client 120b can receive signals sent by the first client 120a, the first AP 110a, the third client 120c, and the second AP 110b. Accordingly, a wireless controller (which can be provided by the network controller 150) coordinates spectrum allocation between the clients 120 and APs 110 so that the clients 120 and APs 110 share the available spectrum.

Although illustrated in FIG. 1 as being connected via wired links 160, in various embodiments wireless links 170 can replace any of the wired links 160. For example, the first switch 130a can be connected to the second switch 130b or the first AP 110a via wireless links 170. Additionally, several APs 110 can be connected to one another via respective wireless links 170 to provide a mesh network. Accordingly, although the present disclosure generally discusses the extension of path tracing through wireless links 170 between an AP 110 and a client 120, the wireless path tracing described herein can be applied over a wireless link 170 between any two networking devices and can be extended across several such wireless links 170 to provide path tracing through a network 100.

Figure 2A:
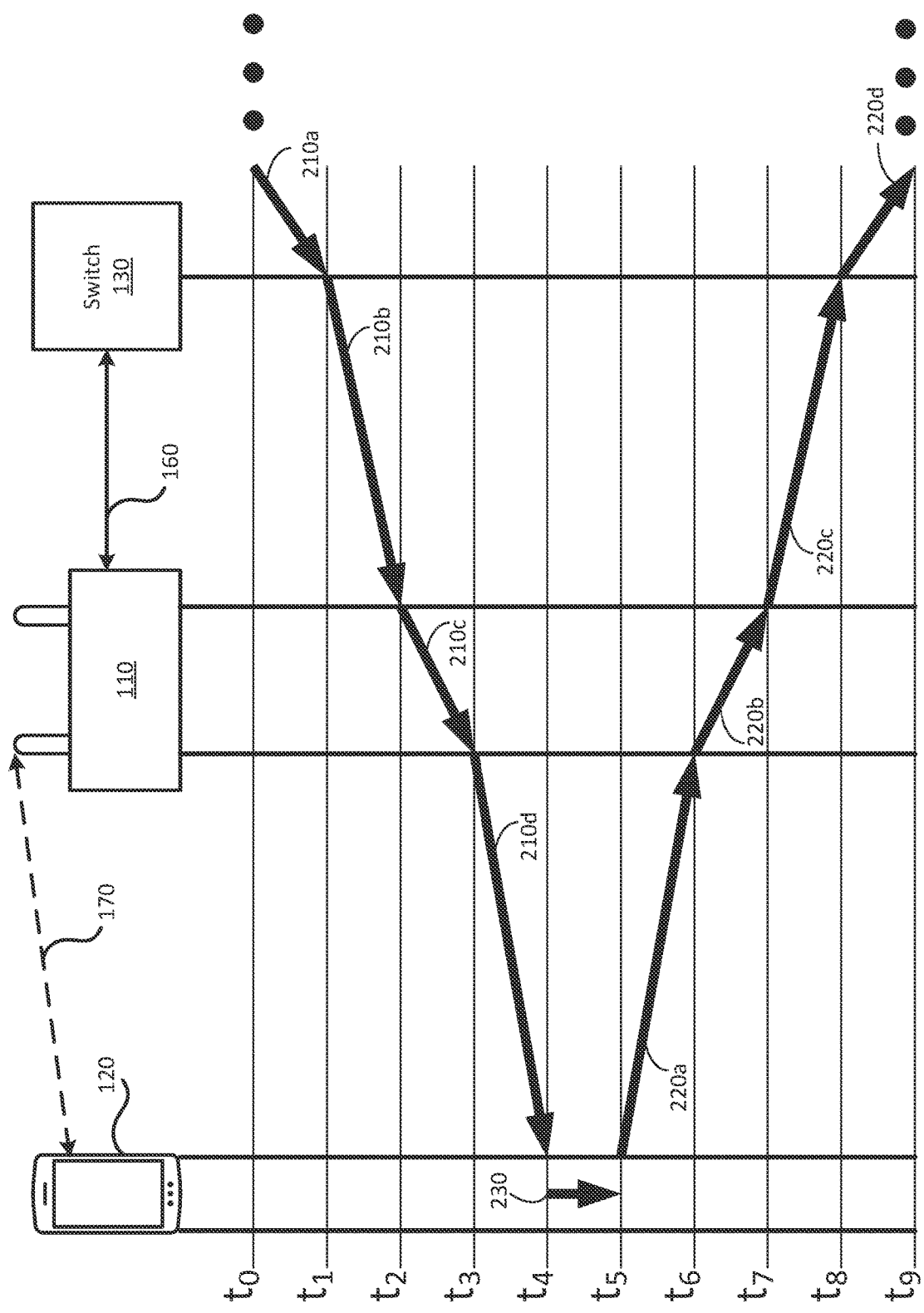
FIG. 2A illustrates a first timing diagram in which a client is a trace target, according to embodiments of the present disclosure.
Figure 2B:
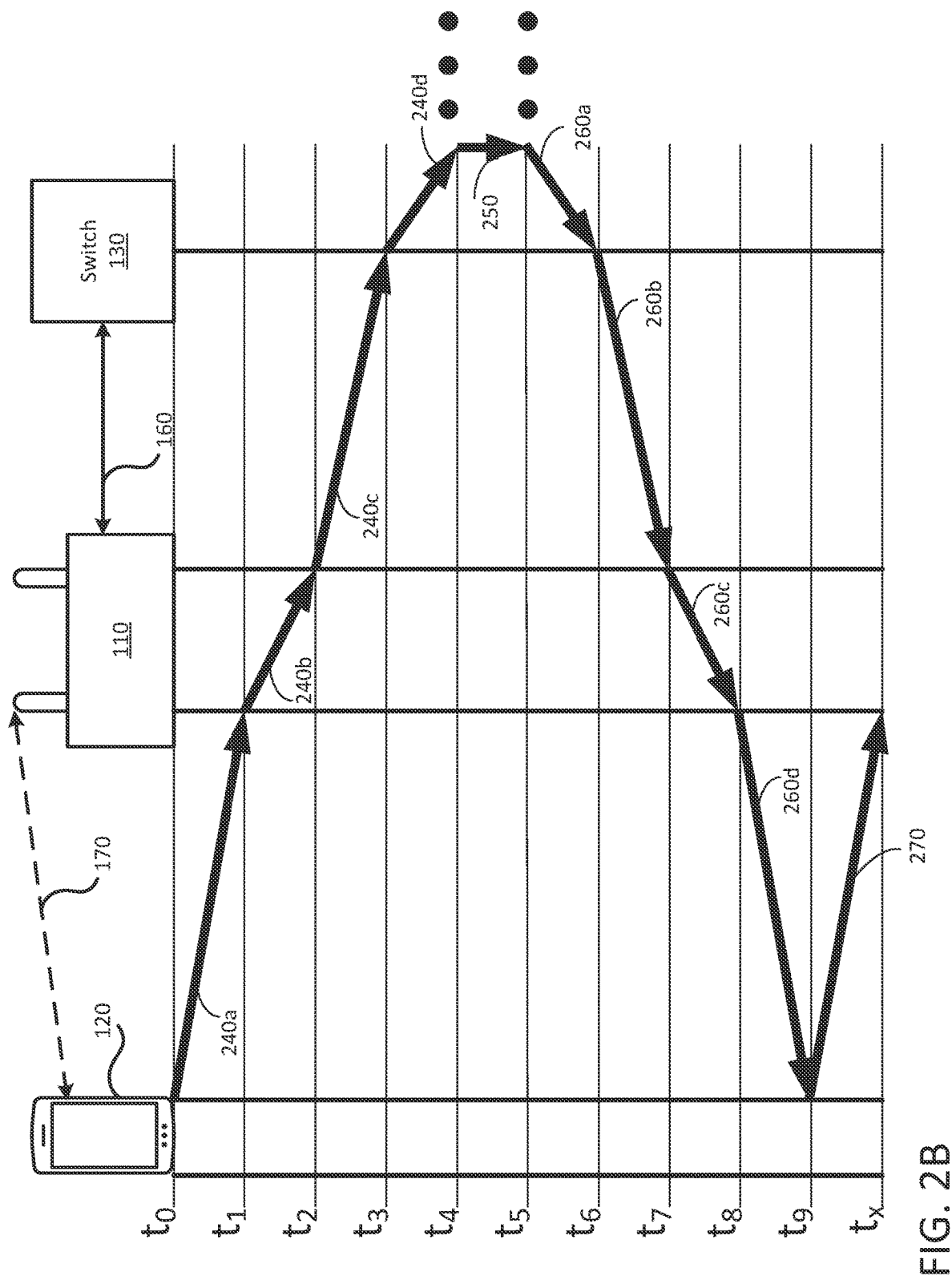
FIG. 2B illustrates a second timing diagram in which a client is a trace source, according to embodiments of the present disclosure.

FIGS. 2A and 2B illustrate pathway and timing diagrams 200a-b for path tracing a wireless link 170 between an AP 110 and a wireless client 120, according to embodiments of the present disclosure. FIG. 2A illustrates a first timing diagram 200a in which a client 120 is a trace target, and FIG. 2B illustrates a second timing diagram 200b in which a client 120 is a trace source. As will be appreciated, although the wireless link 170 is discussed in FIGS. 2A and 2B as between an AP 110 and a client 120, path tracing as described herein can be applied between any two networking devices that are wirelessly linked, and can be extended across several such wireless links 170. Additionally, although the distances between the times in FIGS. 2A and 2B are illustrated with regular intervals, it will be appreciated that subsequent time periods may be the same or different to one another (e.g., $\Delta(t_0, t_1) = \Delta(t_1, t_2)$ or $\Delta(t_0, t_1) \neq \Delta(t_1, t_2)$).

In FIG. 2A an outbound trace packet is generated at and sent from a trace source (not illustrated) to a trace target (the client device 120 in FIG. 2A), which returns an inbound trace packet back to the trace source to measure various network conditions (e.g., loss, jitter, delay, round trip time (RTT), etc.) based on timing measurements between various networking devices along the trace path through the network. In various embodiments, the trace source can be connected to the network via a wired link 160 or a wireless link 170.

A first outbound trace time 210a (generally, outbound trace time 210) begins at time $t_0$, when the trace packet was transmitted from the trace source until the trace packet is received at a switch 130 at time $t_1$. The period of time $t_0$ to time $t_1$ encompasses the transmission and processing times between the various APs 110, clients 120, and switches 130 in the trace path that are not shown in FIG. 2A, and may be subdivided to indicate various network conditions between those network devices. In various embodiments, when the switch 130 initially generates the outbound trace packet, the first outbound trace time 210a may be omitted. The second outbound trace time 210b indicates the transmission time from time $t_1$ to time $t_2$ between the switch 130 and the AP 110.

The AP 110 measures the third outbound trace time 210c from time $t_2$ to time $t_3$ based on the time of arrival (ToA) at time $t_2$ of the outbound trace packet from the switch 130 to the interface buffer of the AP 110 until the time of departure (ToD) for the trace packet at time $t_3$ to the target client 120. The third outbound trace time 210c includes the processing time to convert and encapsulate the received trace packet into a wireless signal according to the protocol used to establish the wireless link 170 between the AP 110 and the target client 120. Additionally, the third outbound trace time 210c includes the scheduling time that the trace packet spends in queue waiting for transmission. In various embodiments, the trace packet remains in queue due to a scheduler operating on the AP 110 indicating that another packet has higher priority for transmission. The scheduler manages when various wirelessly connected clients 120 and APs 110 are allowed to use the shared transmission medium based on the priority levels for the various clients 120, the priority levels of the various APs 110, the priority levels of various data queued for transmission (or reception), etc.

The outbound trace packet departs from the AP 110 at time $t_3$, and the AP 110 receives, at time $t_6$, an inbound trace packet generated and transmitted from the target client 120 back to the target source. The times $t_3$ to $t_6$ include the fourth output trace time 210d, including the time $t_3$ to $t_4$ to transmit the trace packet from the AP 110 to the client 120, a processing and queueing time 230 on the client 120 from time $t_4$ to $t_5$, and a first inbound trace time 220a (generally, inbound trace time 220) from time $t_5$ to $t_6$ to transmit the trace packet from the client 120 back to the AP 110. In some embodiments, the target client 120 provides, with the inbound trace packet, the AP 110 with the timestamps for when the outbound trace packet is received by the client 120 at time $t_4$ and the time that the client 120 transmits the inbound trace packet at time $t_5$. In other embodiments, the AP 110 treats the time period from time $t_3$ to $t_6$ as a block that includes the radio transmission and client processing times.

The AP 110 measures the second inbound trace time 220b from time $t_6$ to time $t_7$ based on the ToA at time $t_6$ of the inbound trace packet from the client 120 until the ToD for the inbound trace packet at time $t_7$ to the switch 130. The second inbound trace time 220b includes the processing time to convert and encapsulate the received trace packet into a wired signal according to the protocol used communicated over the wired link 160 between the AP 110 and the switch 130. Additionally, the second inbound trace time 220b includes the scheduling time that the trace packet spends in queue waiting for transmission. In various embodiments, the trace packet remains in queue due to a scheduler operating on the AP 110 indicating that another packet has higher priority for transmission (e.g., the priority levels for the various clients 120 or the priority levels of various data queued for transmission).

A third inbound trace time 220c begins at time $t_8$, when the trace packet is transmitted from the AP 110 until the trace packet is received at a switch 130 at time $t_8$. Similarly, a fourth inbound trace time 220d from $t_8$ to time $t_9$ encompasses the transmission and processing times from the switch 130 to the various APs 110, clients 120, and switches 130 in the trace path back to the trace source that are not shown in FIG. 2A, and may be subdivided to indicate various network conditions between those network devices. In various embodiments, when the switch 130 initially generated the outbound trace packet, the fourth inbound trace time 220d may be omitted.

In FIG. 2B an outbound trace packet is generated at and sent from a wirelessly connected client 120 acting as a trace source to a trace target elsewhere in the network 100 (not shown in FIG. 2A). In various embodiments, the trace target may be connected to the network 100 via a wired link 160 or a wireless link 170. The trace target returns an inbound trace packet back to the wireless client 120 (as the trace source) to measure various network conditions (e.g., loss, jitter, delay, round trip time (RTT), etc.) based on timing measurements between various networking devices along the trace path through the network 100.

A first outbound trace time 240a begins at time $t_0$, when the client 120 transmits the outbound trace packet to an AP 120 that receives the outbound trace packet at time $t_1$. The second outbound trace time 240b begins at time $t_1$ and lasts until time $t_2$, when the AP 110 transmits the outbound trace packet to the switch 130. The AP 110 measures the second outbound trace time 240b from time $t_1$ to time $t_2$ based on the ToA at time $t_1$ of the outbound trace packet from the client 120 until the ToD for the outbound trace packet at time $t_2$ to the switch 130. The second outbound trace time 240b includes the processing time to convert and encapsulate the received trace packet into a wired signal according to the protocol used communicated over the wired link 160 between the AP 110 and the switch 130. Additionally, the second outbound trace time 240b includes the scheduling time that the trace packet spends in queue waiting for transmission. In various embodiments, the trace packet remains in queue due to a scheduler operating on the AP 110 indicating that another packet has higher priority for transmission (e.g., the priority levels for the various clients 120 or the priority levels of various data queued for transmission).

A third outbound trace time 240c begins at time $t_2$, when the trace packet is transmitted from the AP 110, and lasts until the trace packet is received at a switch 130 at time $t_3$. Similarly, a fourth outbound trace time 250d from $t_3$ to time $t_4$ encompasses the transmission and processing times from the switch 130 to the various APs 110, clients 120, and switches 130 in the trace path to the trace target that are not shown in FIG. 2B, and may be subdivided to indicate various network conditions between those network devices. In various embodiments, when the switch 130 is the trace target, the fourth outbound trace time 240d may be omitted.

After the trace target receives the outbound trace packet at time $t_4$, the trace target process the outbound trace packet and sends, at time $t_5$, an inbound trace packet back to the trace source client 120. The time between times $t_4$ and $t_5$ represent a processing a queuing time 250 for the trace target, and can include the time needed for the trace target to interpret the outbound trace packet, generate the inbound trace packet, and wait for a scheduled opportunity to transmit the outbound trace packet.

A first inbound trace time 260a (generally, inbound trace time 260) begins at time t5, when the inbound trace packet is transmitted from the trace target, and lasts until the trace packet is received at the switch 130 at time $t_6$. Similarly to the third outbound trace time 240c, the first inbound trace time 260a encompasses the transmission and processing times from the trace target to the various APs 110, clients 120, and switches 130 in the trace path that are not shown in FIG. 2B, and may be subdivided to indicate various network conditions between those network devices. In various embodiments, when the switch 130 is the trace target, the first inbound trace time 260a may be omitted.

The second inbound trace time 260b indicates the transmission time from time $t_6$ to time $t_7$ between the switch 130 and the AP 110.

The AP 110 measures the third inbound trace time 260c from time $t_7$ to time is based on the TOA at time $t_7$ of the inbound trace packet from the switch 130 to the interface buffer of the AP 110 until the ToD for the trace packet at time is to the source client 120. The third outbound trace time 210c includes the processing time to convert and encapsulate the received trace packet into a wireless signal according to the protocol used to establish the wireless link 170 between the AP 110 and the source client 120. Additionally, the third inbound trace time 260c includes the scheduling time that the trace packet spends in queue waiting for transmission. In various embodiments, the trace packet remains in queue due to a scheduler operating on the AP 110 indicating that another packet has higher priority for transmission. The scheduler manages when various wirelessly connected clients 120 and APs 110 are allowed to use the shared transmission medium based on the priority levels for the various clients 120, the priority levels of the various APs 110, the priority levels of various data queued for transmission (or reception), etc.

The inbound trace packet departs from the AP 110 at time $t_8$, and the source client 120 receives the inbound trace packet at time $t_0$. In various embodiments, the source client 120 reports the fourth inbound trace time 260d to the network controller 150. In other embodiments, the source client 120 provides the AP 110 with a timestamp for $t_0$ to calculate the fourth inbound trace time 260d from time is or a calculated value for the fourth inbound trace time 260d in a timing report 270 sent at time $t_x$ after time $t_9$ so that the AP 110 can report the fourth inbound trace time 260d to the network controller 150. In various embodiments, the timing report 270 is transmitted with a subsequent trace packet to the same or a different trace target as the outbound trace packet sent at time to. In other embodiments, the timing report 270 is a separate communication sent between the client 120 and the AP 110.

The network controller 150 receives timing information (e.g., some or all of the times $t_0$-$t_9$ or durations thereof discussed in relation to FIGS. 2A and 2B) to evaluate the wireless link 170 between the AP 110 and the client 120 in addition to or separately from the wired links 160 in the trace path through the network 100. In some embodiments, the various network devices report the respective times of arrival or departure of the trace packets to the network controller 150. Accordingly, the network controller 150 evaluates the transmission performance over the wired link 160 between the switch 130 and the AP 110 based on the second outbound trace time 210b and the third inbound trace time 220c (per FIG. 2A) or the third outbound trace time 240c and second inbound trace time 260b (per FIG. 2B).

Similarly, by the AP 110 reporting times $t_2$, $t_3$, $t_6$, and $t_7$ (and optionally times $t_4$ and $t_5$) when handling a trace packet for a client 120 that is a trace target (per FIG. 2A) and times $t_1$, $t_2$, $t_7$, to, and $t_9$ when handling a trace packet for a client that is a trace source (per FIG. 2B), for the network controller 150 to evaluate the wireless link 170.

In various embodiments, in addition to the timing information, the AP 110 also reports to the network controller 150 the buffer depth for the AP 110 at the times of arrival of the trace packets (e.g., $t_2$ and $t_6$ per FIG. 2A and $t_1$ and $t_7$ per FIG. 2B), which allows the network controller 150 to remove the forwarding time and the effects of packet processing by the AP 110 from the measurements of network latency. In effect, knowing the buffer status at the AP 110 allows the network controller 150 to differentiate cell-wide congestion from client-specific congestion, even without knowing what local radio transmission conditions are like at the location of the client 120 or along the path of the wireless link 170 through the environment. For example, the ratio between wireless round trip transmission time (e.g., from time $t_3$ to $t_6$ in FIG. 2A) and the processing and queueing time on the client (e.g., from time $t_4$ to $t_5$ in FIG. 2A) can identify whether the congestion affects the entire cell (when the ratio of $t_3$-$t_6$ to $t_4$-$t_5$ is within a historic proportional range for the given buffer depth), is local to the AP 110 (when the ratio of $t_3$-$t_6$ to $t_4$-$t_5$ is above the historic proportional range), or is local to the client 120 (when the ratio of $t_3$-$t_6$ to $t_4$-$t_5$ is below the historic proportional range).

In some embodiments, the AP 110 sends a trigger for the client 120 to initiate an upstream flow (with OFDMA scheduling). When triggered by the AP 110, the client 120 sends the message at a time requested by the AP 110, and therefore known to the AP 110. The flow of messages then follows the logic described herein, and message frames come back to the client 120, which sends an acknowledgement (ACK) for receipt of communications from the AP 110 (also at a predictable time). In various embodiments, the AP 110 uses the scheduled or predictable times for various time values when calculating round trip time, processing time, or combinations thereof.

In various embodiments, the AP 110 reports the buffer depth in a Buffer Status Report (BSR) to the network controller 150, which the network controller 150 uses to identify client queue depth on the AP 110. In conjunction with a Head of Line (HOL) Access delay measured for the client 120, the network controller 150 evaluates the trace packet's wireless roundtrip time (e.g., from ToD at t3 to the ToA back at the AP 110 at t6) to the BSR ratio to identify the delay (i.e., the time interval from the instant that a packet is at the HOL of the associated MAC queue and is ready to be transmitted and the instant that the acknowledgement frame for the packet is received). The network controller 150 can thereby evaluate the radio transmission and client processing time to identify the contribution of the target client 120 to the network delay. In effect, for similar queue depths, the portion of delay attributable to the AP 110 should remain similar, and any differences in delay can therefore be attributed to the client 120 or the transmission medium.

The BSR informs the AP 110 about the client's queue depth (and optional HOL Delay) per available channel. However, the BSR report only partially identifies client's contribution to the delay variation. Although the network controller 150 can observe the BSR/timers ratio and deduce the client's contribution to delay variation, the BSR is an incomplete representation of the client's performance. For example, in some cases the client 120 may have many packets buffered for transmission, but may be able to process those packets quickly (e.g., high Modulation Coding Scheme MCS, low congestion). However, in other cases, the client 129 may send traffic outside of the trigger windows (e.g., opting out of uplink scheduling), in which case the BSR only partially represents the client traffic congestion. In various embodiments, the level of granularity the BSR report provides sufficient granularity, however, in cases where network controller 150 needs a higher level of granularity, the AP 110 evaluates the Time of Flight (ToF) between the AP 110 and the client 120 (e.g., via a Fine Time Measurement (FTM) request per IEEE 802.11az). However, instead of using a no quality of service (QoS) FTM request, the AP 110 sends an FTM request on each available channel to thereby enable each client 120 to receive an initial FTM request that is carried within a triggered grouped uplink method (e.g., UL-MU-MIMO, OFDMA). In various embodiments, the FTM trigger is carried in or otherwise accompanies the trace packet. Based on the FTM requests, the network controller 150 can measure the time each client 120 takes to process the trace packet and send return a response back to the AP 110 (e.g., $t_4$-$t_6$ per FIG. 2A, $t_9$-$t_x$ per FIG. 2B), and also the ToF between the AP 110 and the client 120, and therefore to evaluate the client processing time.

Additionally, this method also allows the AP to carry the FTM exchange and the test application within different consecutive ACs. The test can be run at regular intervals, or when DNAC detects an asymmetry in the timers expressed above. In this case, the AP runs FTM as per above, then sends both the test application packet and the Local Measurement Report (LMR) request (the consequence of the STA running FTM) one immediately after the other, in the same AC. Thus, the LMR request carries the QoS control field (novel). Upon receiving such frame, a STA must process the frame within the target AC (as per the art). Therefore, the STA response (the LMR report) is directly reflective of the STA AC processing time. By measuring the difference between the ToD (at the AP level) of the LMR report and of the application packet response, DNAC can evaluate not only the STA buffer processing time, but also application's processing time.

In various embodiments, the network controller evaluates the AP processing time to evaluate whether the trace packets are treated asymmetrically between uplink and downlink traffic over the wireless link 170 between the AP 110 and the client 120. Generally, uplink traffic (from the client 120 to the AP 110) is expected to be processed faster than downlink traffic (from the AP 110 to the client 120) due to differences in Machine Access Control (MAC) contention for wired and wireless connections. However, the uplink and down link traffic, during normal operations, are expected to have a linear relationship to one another. The network controller 150 therefore can identify potential causes for abnormalities in network behavior based on changes in the relative timing ratios or deviations from a baseline signaling time (e.g., increasing traffic to/from the AP 110, increasing competition for wireless bandwidth, etc.).

Figure 3:
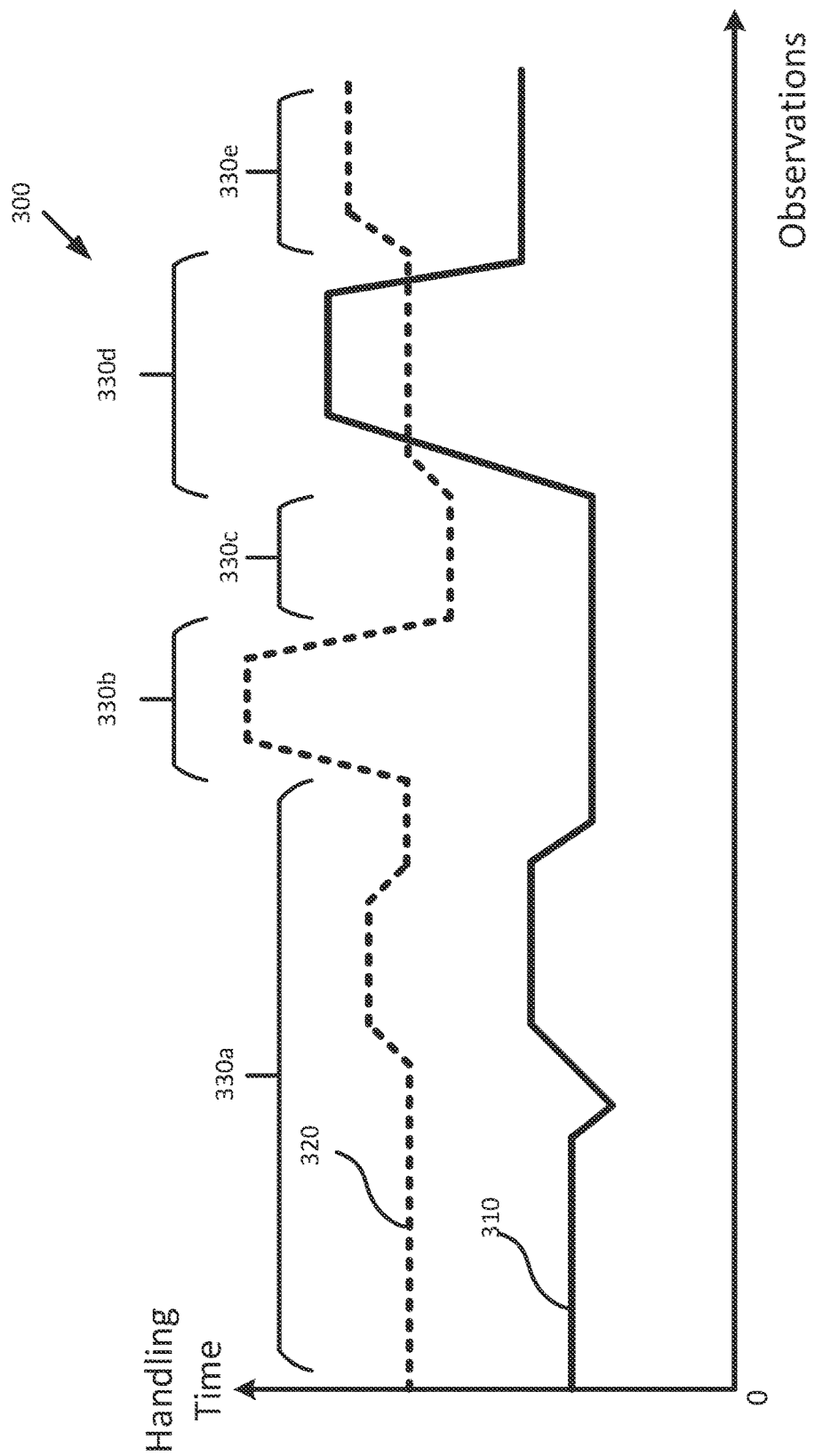
FIG. 3 illustrates a timing symmetry chart, according to embodiments of the present disclosure.

FIG. 3 illustrates a timing symmetry chart 300, according to embodiments of the present disclosure. The timing symmetry chart 300 shows the handling time observed over a number of observations (e.g., via successive transmission and monitoring of a series of trace packets) for an uplink processing time 310 and a downlink processing time 320 at the AP 110. In various embodiments, the uplink time 310 corresponds to the first inbound time 220a (per FIG. 2A) or the first outbound time 240a (per FIG. 2B). Similarly, in various embodiments, the downlink time 320 corresponds to fourth outbound time 210d (per FIG. 2A) or the fourth inbound time 260d (per FIG. 2B).

Various network behaviors and/or abnormalities can be identified based on the ratios between the uplink processing time 310 and the downlink processing time 320. As described herein, a first time period 330a represents a baseline behavior to which the other time periods 330b-e are compared. During the first time period 310a, the uplink processing time 310 and the downlink processing time 320 maintain a substantially constant ratio between one another (e.g., within a deviation threshold), indicating normal operations for the wireless link 170. The third time period 330c and the fifth time period 330e also show the uplink processing time 310 and downlink processing time 320 exhibiting the constant ratio shown in the first time period 330a, but with both of the uplinks and downlinks respectively taking less time or more time, which can indicate overall increased network traffic through the AP 110.

In various embodiments, the network controller 150 analyzes the different time periods that indicate substantially symmetrical uplink/downlink processing times based on a reported buffer depth at the AP 110 at to determine whether the changes in performance tracks a change in buffer depth associated with more traffic or less traffic, or if another condition is slowing or increasing processing speed on the AP 110. For example, when the processing times increase from the first time period 330a to the third time period 330c and corresponding buffer increases are noted, the network controller 150 can identify that the AP 110 is handling increased traffic. However, if the network controller 150 identifies an increase in processing times (e.g., as from the first time period 330a to the third time period 330c) without an increase in buffer depth, the network controller 150 can flag the AP 110 for further analysis to identify whether the AP 110 is properly processing the inbound and output packets.

The second time period 330b illustrates a time period in which the traffic through the AP 110 experiences an increased downlink time 320 compared to the uplink time 310, which remains substantially constant to the prior time period. In various embodiments, an increased downlink time 320 relative to the uplink time 310 indicates network or processing degradation at the AP 110, such as, for example, when increased competition for downlink traffic is received at the AP 110 that delays transmission of the monitored downlink traffic. Similarly, a decreased downlink time 320 relative to the uplink time 310 can indicate a reduction in competition for downlink transmissions. Accordingly, a network controller 150 can signal the AP 110 to normalize the uplink and downlink times (e.g., according to a service level agreement (SLA)) to account for degradation at the AP level by allocating additional time or frequencies divisions for downlink traffic, load balancing the various clients 120 among different APs 110 in the network 100 (e.g., forcing hand offs to new client/AP pairings), setting different priority levels for the traffic generated by or sent to various clients 120, and combinations thereof.

The fourth time period 330d illustrates a time period in which the traffic through the AP 110 experiences an increased uplink time 310 compared to the downlink time 320, which remains substantially constant to the prior time period. In various embodiments, an increased uplink time 310 relative to the downlink time 320 indicates network or processing degradation on the client side, such as, for example, when increased competition for uplink traffic occurs at the client 120, which delays transmission of the monitored uplink traffic. Similarly, a decreased uplink time 310 relative to the downlink time 320 can indicate a reduction in competition for uplink transmissions. Accordingly, a network controller 150 can signal the AP 110 to normalize the uplink and downlink times (e.g., according to a service level agreement (SLA) to account for degradation at the client level by allocating additional time or frequencies divisions for uplink traffic, load balancing the various clients 120 among different APs 110 in the network 100 (e.g., forcing hand offs to new client/AP pairings), setting different priority levels for the traffic generated by or sent to various clients 120, and combinations thereof.

The network controller 150 also surfaces the client contribution to any signaling delay over the wireless link 170 by comparing the round trip time.

Figure 4:
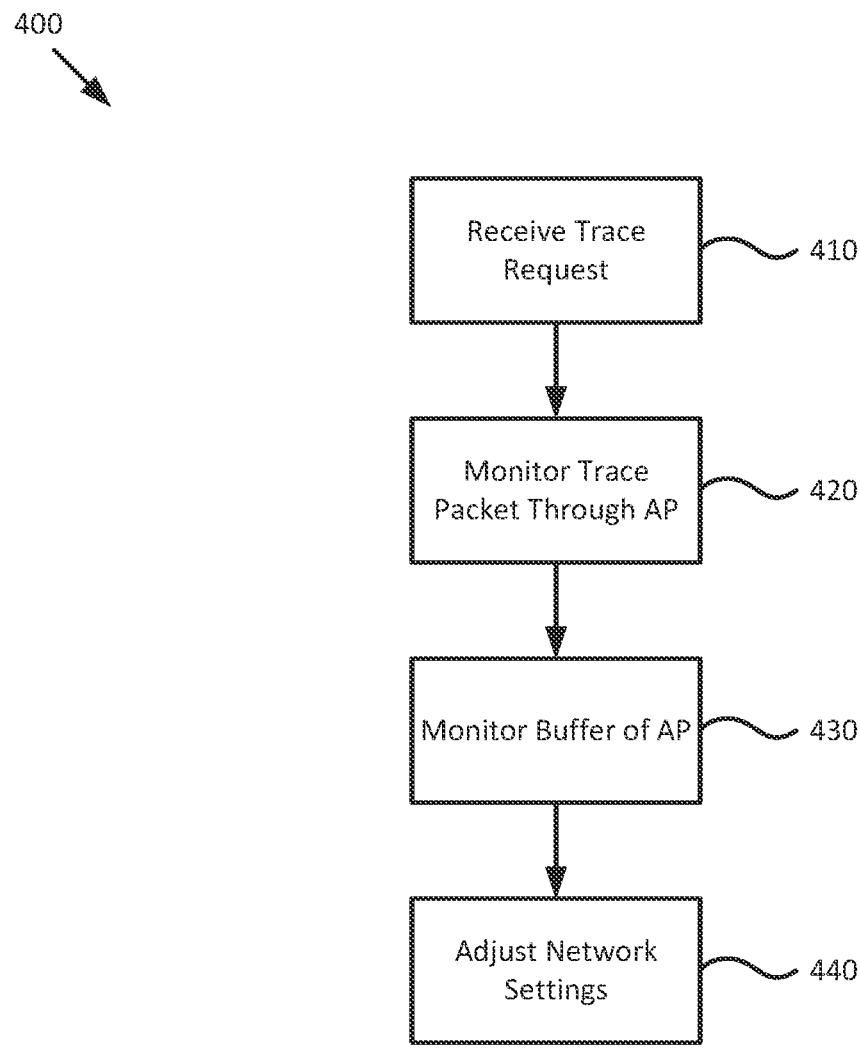
FIG. 4 is a flowchart of a method for automating and extending path tracing over wireless links, according to embodiments of the present disclosure

FIG. 4 is a flowchart of a method 400 for automating and extending path tracing over wireless links, according to embodiments of the present disclosure. Method 400 begins at block 410, where the network controller 150 receives a request to perform a network trace over a path that includes a wireless link 170 provided by an AP 110 configured as a transparent forwarder between a trace source and a trace target. In various embodiments, the trace source is connected to the AP 110 via the wireless link 170, the trace target is connected to the AP 110 via the wireless link 170, or the AP 110 is connected to another AP 110 via the wireless link 170 (e.g., as a bridge or part of a mesh network) and the trace source/target are on opposite sides of the wireless link 170. The AP 110 is part of a network 100 that can include several wired links 160 and wireless links 170, which can be provided by the AP 110 or other APs 110 in the network 100. Additionally, the AP 110 can provide several wireless links 170 to various other APs 110 or client 120, which compete for access to the transmission medium. Additionally, the transmission medium may be subject to various levels of passive or active interference (e.g., walls, rogue signaling devices) that affect the time of transmission over the wireless link 170.

At block 420, the AP 110 reports the various times of arrival and departure from the AP 110 of a trace packet to the network controller 150 to monitor. The AP 110 reports several such ToAs and ToDs to the network controller 150 over several instances of handling the trace packets to identify trends in transmission and holding times at the AP 110 and devices connected to the AP 110 via the wireless link 170 (e.g., a client 120 or another AP 110). In various embodiments, the timing data at the AP 110 is co-reported with timing data from other network devices in the trace path (e.g., various switches 130, other APs 110, reporting-enabled clients 120, etc.) to form a coherent trace route through the network 100. Additionally or alternatively, the AP 110 can handle.

In one example, a trace source sends a trace packet to the AP 110 via a wired link 160 to monitor network behavior to a trace target connected to the AP 110 via a wireless link 170 provided by the AP 110. In this example, the AP 110 receives the outbound trace packet at a first time of arrival (e.g., time $t_2$ per FIG. 2A) and transmits the outbound trace packet at a first time of departure (e.g., time $t_3$ per FIG. 2A) over the wireless link 170. The AP 110 receives the inbound trace packet (addressed back to the trace source) at a second time of arrival (e.g., time $t_6$ per FIG. 2A) and transmits the inbound trace packet at a second time of departure (e.g., time $t_7$ per FIG. 2A) back to the trace source.

In another example, a trace source sends a trace packet to the AP 110 via a wireless link 170 provided by the AP 110 to a trace target connected (by a wired link 160 or a wireless link 170) to the network 100 that the AP 110 provides access to. In this example, the AP 110 receives the outbound trace packet over the wireless link 170 at a first time of arrival (e.g., time $t_1$ per FIG. 2B) and transmits the outbound trace packet at a first time of departure (e.g., time $t_2$ per FIG. 2B) over the network 100. The AP 110 receives the inbound trace packet (addressed back to the trace source) at a second time of arrival (e.g., time $t_7$ per FIG. 2B) and transmits the inbound trace packet at a second time of departure (e.g., time is per FIG. 2B) back to the trace source. In various embodiments, the AP 110 receives an acknowledgement message from the target source (or an AP 110 on the other side of the wireless link 170) that provides information about the time of flight of the inbound trace packet over the wireless link (e.g., identifying a time of reception at time $t_9$ at a later time $t_x$ per FIG. 2B).

At block 430, the AP 110 reports a buffer status of the AP 110 for communication of the wireless link 170 at the first time of ToA and the second ToA to the network controller 150 to monitor in conjunction with the transmission times (per block 420). In various embodiments, block 430 and block 420 are performed in conjunction with one another so that the buffer statues of the AP 110 correlate to the reported ToAs and ToDs for the trace packets in a given instance of path route tracing and analysis. The buffer statuses enable the network controller 150 to surface a client contribution to the network delay over the wireless link 170 based on the ratio between a client handling time for the trace packet (e.g., time $t_4$ to $t_5$ within times $t_3$ to $t_6$ per FIG. 2A). For example, when the trace packet takes longer than expected to return to the AP 110, the delay can be ascribed to busy network conditions (e.g., a higher relative buffer depth) or the client 120 (e.g., a lower relative buffer depth).

At block 440, the network controller 150 analyses the network performance over the wireless link 170 and, in response to detecting a network anomaly based on the monitored times and buffers, adjusts network settings at the AP 110 to counteract those network anomalies. Depending on the source (and severity) of the anomaly, the network controller 150 can adjust various network settings such as: signaling the AP 110 to change bands or channels to avoid interference in a given frequency range, signaling the AP 110 to initiate handoff of (or disconnect without handoff) one or more clients 120 to different APs 110 in the network to free available bandwidth or encourage various connected devices to identify a more appropriate AP 110, set different priority levels for the traffic of one or more clients 120 or wirelessly connected devices, and increasing/decreasing transmission power, among other settings. Additionally or alternatively, the network controller 150 can adjust network settings at other APs 110 in the network based on the adjustments made at the initial AP 110 or instead of adjusting the initials AP 110 (e.g., moving a second AP 110 to a different channel to leave a first AP 110 operating in a clear channel).

Figure 5:
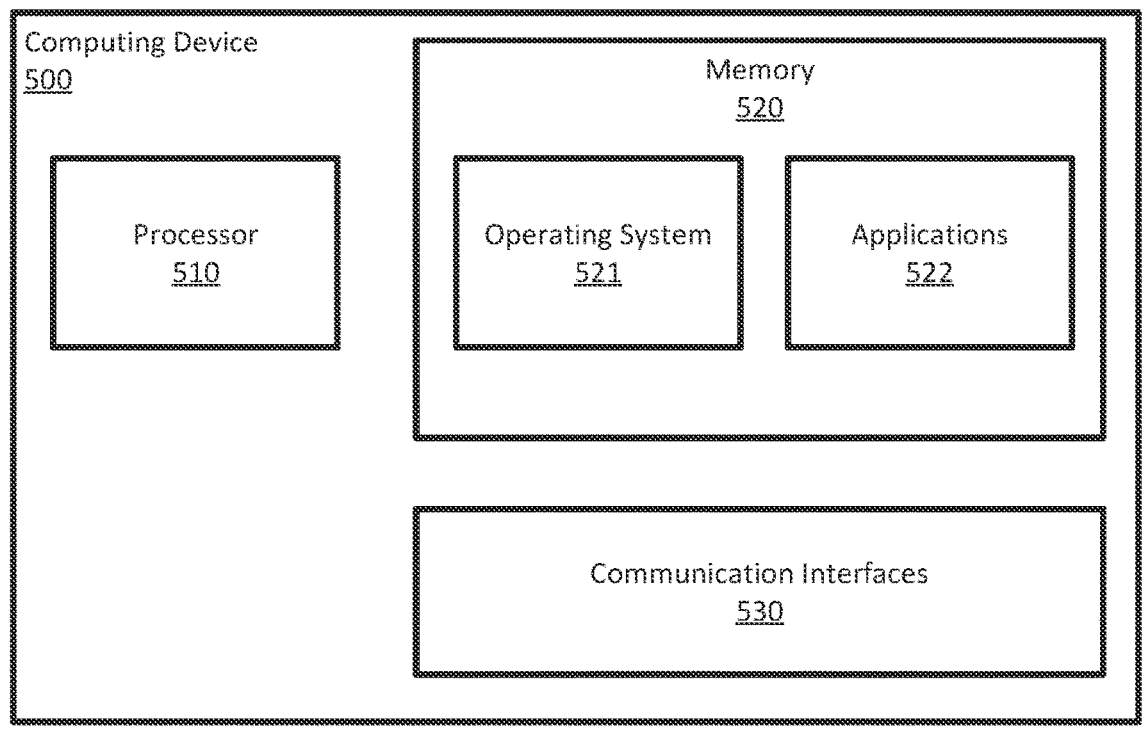
FIG. 5 illustrates a computing device illustrates hardware of a computing device, according to embodiments of the present disclosure.

FIG. 5 illustrates a computing device illustrates hardware of a computing device 500, which may represent an AP 110, a client 120, or various other devices in a network 100 according to the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports including out-pins and in-pins to a microcontroller. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    receiving request to perform a network trace over a wireless link provided by a first network device configured as a transparent forwarder between a trace source and a trace target;
    monitoring a trace packet from a first time of arrival at the first network device, a first time of departure from the first network device, a second time of arrival at the first network device, and a second time of departure from the first network device;
    monitoring a buffer status of the first network device at the first time of arrival and the second time of arrival; and
    in response to identifying a network anomaly based on the trace packet and the buffer status, adjusting a network setting at the first network device.

2. The method of claim 1, wherein the wireless link connects the first network device to the trace target, wherein the first network device receives an inbound trace packet at the first time of arrival and receives an outbound trace packet at the second time of arrival.

3. The method of claim 1, wherein the wireless link connects the first network device to the trace source, wherein the first network device receives an outbound trace packet at the first time of arrival and receives an inbound trace packet at the second time of arrival.

4. The method of claim 3, wherein the trace source reports a third time of arrival of the inbound trace packet at the trace source in a subsequent transmission from the trace target to the first network device.

5. The method of claim 1, wherein the wireless link connects the first network device to a second AP.

6. The method of claim 1, wherein monitoring the trace packet identifies processing asymmetries on the first network device between an uplink processing time and a downlink processing time, wherein the uplink processing time is a first time period between the first time of arrival and the first time of departure, wherein the downlink processing time is a second time period between the second time of arrival and the second time of departure, wherein adjusting the network setting includes signaling wireless clients of the first network device to handoff to a different AP.

7. The method of claim 6, further comprising:
    surfacing a client contribution to a network delay based on a ratio between a client handling time and the buffer status, wherein the client handling time occurs between the first time of departure and the second time of arrival.

8. A system, comprising:
    a processor; and
    a memory device including instructions that when executed by the processor perform an operation including:
        receiving request to perform a network trace over a wireless link provided by a first network device configured as a transparent forwarder between a trace source and a trace target;
        monitoring a trace packet from a first time of arrival at the first network device, a first time of departure from the first network device, a second time of arrival at the first network device, and a second time of departure from the first network device;
        monitoring a buffer status of the first network device at the first time of arrival and the second time of arrival; and
        in response to identifying a network anomaly based on the trace packet and the buffer status, adjusting a network setting at the first network device.

9. The system of claim 8, wherein the wireless link connects the first network device to the trace target, wherein the first network device receives an inbound trace packet at the first time of arrival and receives an outbound trace packet at the second time of arrival.

10. The system of claim 8, wherein the wireless link connects the first network device to the trace source, wherein the first network device receives an outbound trace packet at the first time of arrival and receives an inbound trace packet at the second time of arrival.

11. The system of claim 10, wherein the trace source reports a third time of arrival of the inbound trace packet at the trace source in a subsequent transmission from the trace target to the first network device.

12. The system of claim 8, wherein the wireless link connects the first network device to a second AP.

13. The system of claim 8, wherein monitoring the trace packet identifies processing asymmetries on the first network device between an uplink processing time and a downlink processing time, wherein the uplink processing time is a first time period between the first time of arrival and the first time of departure, wherein the downlink processing time is a second time period between the second time of arrival and the second time of departure, wherein adjusting the network setting includes signaling wireless clients of the first network device to handoff to a different AP.

14. The system of claim 13, the operation further including:
    surfacing a client contribution to a network delay based on a ratio between a client handling time and the buffer status, wherein the client handling time occurs between the first time of departure and the second time of arrival.

15. A memory device including computer readable instructions that when executed by a processor perform an operation comprising:
    receiving request to perform a network trace over a wireless link provided by a first network device) configured as a transparent forwarder between a trace source and a trace target;
    monitoring a trace packet from a first time of arrival at the first network device, a first time of departure from the first network device, a second time of arrival at the first network device, and a second time of departure from the first network device;
    monitoring a buffer status of the first network device at the first time of arrival and the second time of arrival; and
    in response to identifying a network anomaly based on the trace packet and the buffer status, adjusting a network setting at the first network device.

16. The memory device of claim 15, wherein the wireless link connects the first network device to the trace target, wherein the first network device receives an inbound trace packet at the first time of arrival and receives an outbound trace packet at the second time of arrival.

17. The memory device of claim 15, wherein the wireless link connects the first network device to the trace source, wherein the first network device receives an outbound trace packet at the first time of arrival and receives an inbound trace packet at the second time of arrival, and wherein the trace source reports a third time of arrival of the inbound trace packet at the trace source in a subsequent transmission from the trace target to the first network device.

18. The memory device of claim 15, wherein the wireless link connects the first network device to a second AP.

19. The memory device of claim 15, wherein monitoring the trace packet identifies processing asymmetries on the first network device between an uplink processing time and a downlink processing time, wherein the uplink processing time is a first time period between the first time of arrival and the first time of departure, wherein the downlink processing time is a second time period between the second time of arrival and the second time of departure, wherein adjusting the network setting includes signaling wireless clients of the first network device to handoff to a different AP.

20. The memory device of claim 19, further comprising:
surfacing a client contribution to a network delay based on a ratio between a client handling time and the buffer status, wherein the client handling time occurs between the first time of departure and the second time of arrival.

* * * * *

UNITED STATES PATENT AND TRADEMARK OFFICE
CERTIFICATE OF CORRECTION

| | |
|---|---|
| PATENT NO. | : 11,743,160 B2 |
| APPLICATION NO. | : 17/816887 |
| DATED | : August 29, 2023 |
| INVENTOR(S) | : Thomas Szigeti et al. |

It is certified that error appears in the above-identified patent and that said Letters Patent is hereby corrected as shown below:

In the Specification

In Column 1, Line 58, after "disclosure" insert -- . --.

In Column 7, Line 19, delete "is" and insert -- $t_8$ --.

In Column 7, Line 22, delete "is" and insert -- $t_8$ --.

In Column 7, Line 40, delete "$t_0$." and insert -- $t_9$. --.

In Column 7, Line 43, delete "$t_0$" and insert -- $t_9$ --.

In Column 7, Line 44, delete "is" and insert -- $t_8$ --.

In Column 8, Line 4, delete "to," and insert -- $t_8$, --.

In Column 11, Line 5, delete "(SLA)" and insert -- (SLA)) --.

In Column 12, Line 9, delete "is" and insert -- $t_8$ --.

In the Claims

In Column 16, Line 38, in Claim 15, delete "device)" and insert -- device --.

Signed and Sealed this
Fifth Day of December, 2023

Katherine Kelly Vidal
*Director of the United States Patent and Trademark Office*